United States Patent [19]
Smith et al.

[11] Patent Number: 5,995,942
[45] Date of Patent: Nov. 30, 1999

[54] STORE-LEVEL MARKETING SYSTEM

[75] Inventors: Mark S. Smith; Seth M. Epstein; Jennifer J. Smith, all of West Hartford, Conn.; Arthur D. Corarito, Rowe, Mass.; George V. Cinquegrana, Southbury, Conn.

[73] Assignee: Tactical Retailing Solutions, West Hartford, Conn.

[21] Appl. No.: 08/614,514

[22] Filed: Mar. 13, 1996

[51] Int. Cl.⁶ .................................................. G06F 7/04
[52] U.S. Cl. ................................. 705/14; 705/16; 705/21; 382/100; 346/136; 194/217; 186/61; 400/120
[58] Field of Search .............................. 400/120; 186/61; 705/14, 16, 21; 346/136; 382/100; 194/217

[56] References Cited

U.S. PATENT DOCUMENTS

| | | | |
|---|---|---|---|
| 3,845,850 | 11/1974 | Herr et al. | 197/1 R |
| 4,896,791 | 1/1990 | Smith | 221/7 |
| 4,910,672 | 3/1990 | Off et al. | 705/14 |
| 4,982,346 | 1/1991 | Girouard et al. | 364/578 |
| 5,025,139 | 6/1991 | Halliburton, Jr. | 235/379 |
| 5,039,848 | 8/1991 | Stoken | 235/381 |
| 5,176,224 | 1/1993 | Spector | 186/52 |
| 5,351,071 | 9/1994 | Matsuda et al. | 346/136 |
| 5,353,218 | 10/1994 | De Lapa et al. | 705/14 |
| 5,450,102 | 9/1995 | Ishida et al. | 346/136 |
| 5,592,560 | 1/1997 | Deaton et al. | 382/100 |
| 5,612,868 | 3/1997 | Off et al. | 705/14 |
| 5,620,079 | 4/1997 | Molbak | 194/217 |

OTHER PUBLICATIONS

Share Builder ™ brochure from Micro Enhancement International, 1997.
"Brand Marketing Through the Supermarket Trade", *Brand Marketing*, Feb. 3, 1997.
"MEI files for stock offering", by Paul Read, *Journal of Business*, Jan. 1996.
"Getting to Know You", by Joanne Friedrick, *Grocery Marketing*, Oct. 1995.
"Roundy's Gains With Market Basket Data", by D'Anne Hotchkiss, *Retail Information Systems News*, Oct. 1995.
"Loyalty Programs Reach the Right Consumers", by D'Anne Hotchkiss, *RIS News*, Oct. 1995.
"MEI's Computer Coupons Cut Out the Clippings", by Paul Read, *Spokane, WA, Journal of Business*, Jul. 27, 1995.
"Electronic Marketing", *In Store, The Newsletter of In–Store Marketing & Business*, Jul. 1995.
"Electronic Marketin Called Promotional Key", by Denise Zimmerman.
"Roundy's Division Rolling Out Satellite Communications Net", by Denise Zimmerman, *Supermarket News*, May 8, 1995.
"Electronic Marketing", *In–Store, The Newsletter of In–Store Marketing & Business*, Apr. 1995.
"Electronic Marketing", *In–Store, The Newsletter of In–Store Marketing & Business*, Mar. 1995.
"Roundy's to Roll Out Electronic Marketing", by Denise Zimmerman, *Supermarket News*, Oct. 17, 1994.
"Electronic Marketing and Retail's Future", by Ted Jackson, *Grocery Retailing News*, Sep. 12, 1994.

(List continued on next page.)

*Primary Examiner*—Allen R. MacDonald
*Assistant Examiner*—Jagdish Patel
*Attorney, Agent, or Firm*—Bachman & LaPointe, P.C.

[57] ABSTRACT

The present invention relates to a store level marketing system and a unique printer to be used in the system. The store level marketing system includes an activation device for initiating use of the system and for providing the system with information about the consumer using it, a network interface or computer for selecting a series of offers/discounts to be printed on a piece of paper, and a printer for printing a paper document containing the selected offers/discounts. The system further includes a checkout station which communicates with the network interface or the computer to provide it with information about the purchases made by the consumer. In a preferred embodiment, the printer is a thermal printer provided with a mechanism for substantially eliminating any curl in the paper being fed into the printer. The curl eliminating mechanism includes a tube which is pressed against the paper to impart a reverse curl to the paper which is opposite to the natural curl of the paper.

39 Claims, 6 Drawing Sheets

OTHER PUBLICATIONS

"Promotion Technology Advances", *Supermarket Strategic Alert*, Jun. 1994.

"Targeted Discounts Scrap Paper Coupons", by Peg Masterson, *Advertising Age*, Jun. 13, 1994.

"Mega Marts Tests Card–Based Electronic Couponing System", by Denise Zimmerman, *Supermarket News*, Jun. 13, 1994.

"MEI Tests New System with AT&T", by Paul Read, *Journal of Business*, May 26, 1994.

"Electronic Coupons Raise Privacy Issue", by Kathleen Waterbury, *Milwaukee, WI Sentinel*, May 16, 1994.

"Racine goes On–Line in May", *The Journal Times*, May 6, 1994.

"Computer Systems Replaces Coupons", *The Journal Times*, May 6, 1994.

"Pick 'n Save Custom–Tailors Coupons", by Dave Backmann, *Kenosha, WI News*, May 6, 1994.

"Store Coupons Computerized", *Beloit, WI News*, May 5, 1994.

"Computers Replacing Discout Coupins", *Superior, WI Telegram*, May 5, 1994

"New Computer System Aims for Couponless Discounts", *Sheboygan, WI Press*, May 5, 1994.

"Computer System Replaces Coupons at Pick 'n Save", *Watertown, WI Times*, May 5, 1994.

"Computers May Replace Coupons at 12 Stores", by Larry Engel, *the Milwaukee Journal*, May 5, 1994.

"Target Marketing Made Easy", by Leslie Beyer, *Grocery Marketing*, Feb. 1997.

FIG. 6

(Figure 6 shows a rotated coupon/savings sheet with a 5×5 grid of product coupons. Reading the grid, the entries are:)

| | | | | |
|---|---|---|---|---|
| Dbl Action 40 Tablets — Aisle 1 — Save $0.40 | Advantage soft angle 40 — Aisle 1 — Save $0.50 | Comfort Super 20 count — Aisle 1 — Save $0.50 | Pantiliners Amt 18–22 count — Aisle 1 — Save $0.40 | Toothpaste 3.5 oz. — Aisle 1 — Save $0.60 | Mouthwash 16 oz. — Aisle 1 — Save $0.50 |
| Hemorroid ointment 2 oz. — Aisle 2 — Save $0.40 | Muscle RubCream 3 oz. — Aisle 2 — Save $0.25 | Any Type Any Size — Aisle 3 — Save $0.50 | Decongestant 1 oz. — Aisle 3 — Save $0.50 | Orig. Choc Flavor 40 Tablets — Aisle 3 — Save $0.60 | Coated Tablets 50 Count — Aisle 3 — Save $0.50 |
| Caplets 12 count — Aisle 3 — Save $0.75 | Any Type Any Size — Aisle 3 — Save $0.50 | Cramp Relief 200mg/24 Tabs — Aisle 3 — Save $0.75 | Chewable Tablets 30 Count — Aisle 3 — Save $0.50 | Saline Sensitive / 12 oz. — Aisle 3 — Save $0.60 | Elastic Lee 36 Count — Aisle 4 — Save $1.00 |
| Ultra Detergent 50 oz. — Aisle 10 — Save $0.50 | Hard Candy 14 oz. — Aisle 1 — Save $0.20 | Lightbulbs 4 PK 40–100 watt — Aisle 13 — Save $0.50 | Baby Wipes W/Refill 168 cnt — Aisle 14 — Save $0.25 | Baby Shampoo 50.7 oz. — Aisle 14 — Save $0.50 | Lotion 9 oz. — Aisle 14 — Save $0.50 |
| Cotton Swabs 200 count — Aisle 14 — Save $0.50 | Lotion 16 oz. — Cosme — Save $0.75 | Max Strength 1 oz. — Cosme — Save $0.50 | Cream 1.59 oz — Pharm — Save $1.00 | Any 3 Pak Limit 3/customer — Photo — Save $0.75 | 24 exp or more limit 3/customer — Photo — Save $0.45 |

Total Available Savings: $16.00

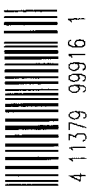

4 11379 99916 1

11

STORE-LEVEL MARKETING SYSTEM

BACKGROUND OF THE INVENTION

The present invention relates to a store-level marketing system for dispensing printed offers and product/store information to consumers and to an improved printer having particular utility in said store-level marketing system.

Systems for dispensing offers to consumers are known in the art. U.S. Pat. No. 4,896,791 to Smith illustrates one such system. The Smith system displays a number of images, each image representing a product to be promoted. The system also includes a product selection area to be manipulated by a consumer to select that product. A switch is associated with each selection area to register the selection. The system receives an access code unique to the consumer, records product selections made by the consumer, compares the product selected by the consumer with a preselected quota, and issues a coupon for the product selected by the consumer if the quota for that consumer is not exceeded. One of the disadvantages to the Smith system is that it does not allow a retailer to customize the coupons available to an individual consumer.

U.S. Pat. No. 4,982,346 to Girouard et al. relates to a mall promotion network apparatus and method. The apparatus is a computer system for automating advertising and promotional campaigns. The computer system includes a magnetic stripe card reader, bar code reader, monitor, printer, keyboard, and touchscreen input device. Software executing on the computer manages the operations of the devices. The system displays advertisement and product or store locator maps, dispenses coupons, accepts products orders, and manages customer surveys. The system is very complex and does not allow a retailer to customize the coupons to be offered to each individual consumer.

U.S. Pat. No. 5,025,139 to Halliburton, Jr. illustrates a redeemable coupon disbursement control and reporting system for automated teller machines. The system includes either a bar code scanner attachment used with preprinted continuous roll or single sheet automated teller machine. In either form, first recording means are communicably attached to the disbursing or printing means and remote optical scanning means are employed at the point of coupon redemption, such scanning means being attached to either such first or a second recording means reconcilable with information recorded on such first recording means. This system also suffers from the deficiency that it does not allow the coupons to be dispensed to a consumer to be customized for the consumer.

U.S. Pat. No. 5,039,848 to Stoken relates to a machine for dispensing a plurality of coupons. The machine includes a cabinet and a display area on the cabinet indicating the different bargains capable of being acquired by redemption of the respective coupons and a specific amount of money required to obtain each respective coupon. Selection buttons mounted on the cabinet are used to select a desired one of the different bargains and the respective coupon therefor. A coin slot and collection box in the cabinet are used to receive various amounts of money. The coupons are stored in the cabinet and are aligned with a coupon dispenser which is capable of dispensing each coupon to the exterior of the cabinet through a slot. Control circuitry is provided to insure that money is deposited into the collection box before the coupon is dispensed. This system also suffers from the deficiency that it does not allow the retailer to customize the coupons to be offered to an individual consumer.

U.S. Pat. No. 5,176,224 to Spector relates to a computer controlled system including a printer dispenser for merchandise coupons. The system includes a coupon printer-dispenser installed at a supermarket which makes it possible for a shopper to receive a merchandising coupon entitling him/her to a specified discount on the product identified on the coupon. The printer, which is computer controlled, is linked to at least one manufacturer whose product is available in the supermarket. The manufacturer instructs the printer as to the data to be printed. The printer, when actuated by the shopper, prints on a universal coupon blank the identity of the manufacturer's product and the discount to which the holder is entitled as then determined by the manufacturer, the printed coupon then being dispensed. When the shopper purchases this product and redeems the coupon at a checkout counter at the supermarket, he is accorded the specified discount. Checkout counters at the supermarkets having coupon dispenser installations are linked to each manufacturer, thereby completing the loop, the manufacturer being provided with a readout of discount coupon transactions so that on the basis of this readout, he can alter the discount amount to be printed on the blank coupon. This system also suffers from the deficiency that a retailer can not customize the coupons offered to the consumer.

In Applicant's opinion, none of these prior art systems allow retailers and product manufacturers the ability to effectively reach consumers in-store. Still further, none of these systems provide the ability to trigger multiple offers from a single scan of a savings sheet controlled by a unique identifier code. Still further, none of these systems address practical issues such as the problem of avoiding curling of the paper on which the consumer offers are printed.

SUMMARY OF THE INVENTION

Accordingly, it is an object of the present invention to provide a store level marketing system which allows retailers and product manufacturers the ability to reach consumers in-store, just before they begin their shopping experience, with promotional offers or incentives which entice consumers to purchase.

It is a further object of the present invention to provide a store level marketing system as above which issues a printed document containing a collection of promotional incentives with a unique customer identification code which consumers use to redeem promotional offers at checkout. The unique customer identification code need only be scanned once at checkout to obtain any/all listed savings and once scanned, voids the document so it cannot be re-scanned.

It is yet a further object of the present invention to provide a store level marketing system as above which collects profiles on individual purchases and allows retailers and manufacturers the ability to target consumers based on individual purchase behavior.

It is still a further object of the present invention to provide a store level marketing system which includes an improved printer for printing a savings/information sheet.

It is yet a further object of the present invention to provide a printer as above which has means for substantially removing or eliminating curls from the paper upon which the savings/information sheet is to be printed.

The foregoing objects are attained by the store-level marketing system and the improved printer of the present invention.

The store-level marketing system of the present invention allows retailers and manufacturers to customize consumer offers and other information on a store by store basis as well as to each individual consumer. Shoppers using the system activate it such as by swiping a card or pressing a button on a dispenser located within the store. Substantially instantaneously, they receive a sheet of savings containing promotional offers and/or incentives as well as product information. The savings sheets are dispensed daily to in-store shoppers and used by shoppers to save money on that day's purchases. Each savings sheet contains a collection of promotional incentives and a unique customer identification code and may graphically display familiar brand logos for high impact and easy recognition. The savings sheet provides shoppers with an organized and concise way to see the available savings. The system of the present invention further has the advantage that there is only one sheet to hand to the cashier to obtain the savings. An individualized code is provided at the bottom of the savings sheet, which need only be scanned once at checkout to obtain any/all savings listed on savings sheet. The system of the present invention has means for interfacing with the store's point-of-sale (POS) system and for adjusting purchase totals to reflect savings. The system allows the retailer/marketer to emphasize savings by summarizing them on the cash register receipt. Shoppers know how much they save each and every time they shop. The system includes means for preventing the savings sheet from being scanned more than once. The system further has means for granting discounts only when the sheet and actual promoted products are scanned at the checkout counter. The system of the present invention further has means to tally all offer and item movement data for instant redemption verification and means for generating consumer buying profiles on consumers utilizing the savings sheet.

The store level marketing system of the present invention in one embodiment includes an enclosure such as a cabinet, a printer assembly mounted in the cabinet for dispensing a savings sheet, means for activating the system, which activating means inputs into the system information about the consumer using the system, and means associated with the activating means for selecting a unique identification number for the savings sheet, for determining the offers and/or product information to be printed on the savings sheet, and for instructing the printer to issue the paper document known as the savings sheet, which document contains at least one redeemable offer for the consumer. In accordance with the present invention, the offer(s) contained in the paper document issued to the consumer may be customized to that consumer. The printer is preferably vertically mounted in the cabinet so that the printed savings sheet is fed into a gravity chute. The consumer retrieves the offer/savings sheet from a slot at the bottom of the gravity chute.

The store level marketing system and the printer used therein are both novel and unique. The printer which the store level marketing system utilizes has means for holding a supply of paper to be fed into the printer, a printer head assembly which includes a printing head for placing printed matter, high quality graphics, and product logos on a surface of the offer/savings sheet, and means for substantially removing or eliminating curls in the paper. The curl removing means comprises an attachment pivotally mounted to the sides of the casing enclosing the printer head assembly. The attachment has two side arms and a tube extending between the side arms for introducing a reverse curl to the paper. spring means are provided for holding the tube against the paper. The curl removing means also includes a cam assembly for adjusting the position of the tube against the paper as the paper supply decreases to insure that the proper amount of reverse curl is applied to the paper.

Other details, objects, and advantages of the present invention are set forth in the following detailed description and the accompanying drawings wherein like reference numerals depict like elements.

BRIEF DESCRIPTION OF THE DRAWINGS

FIG. 6 illustrates an offer/savings sheet dispensed by the system of the present invention.

DETAILED DESCRIPTION OF THE PREFERRED EMBODIMENT(S)

Figure 1:
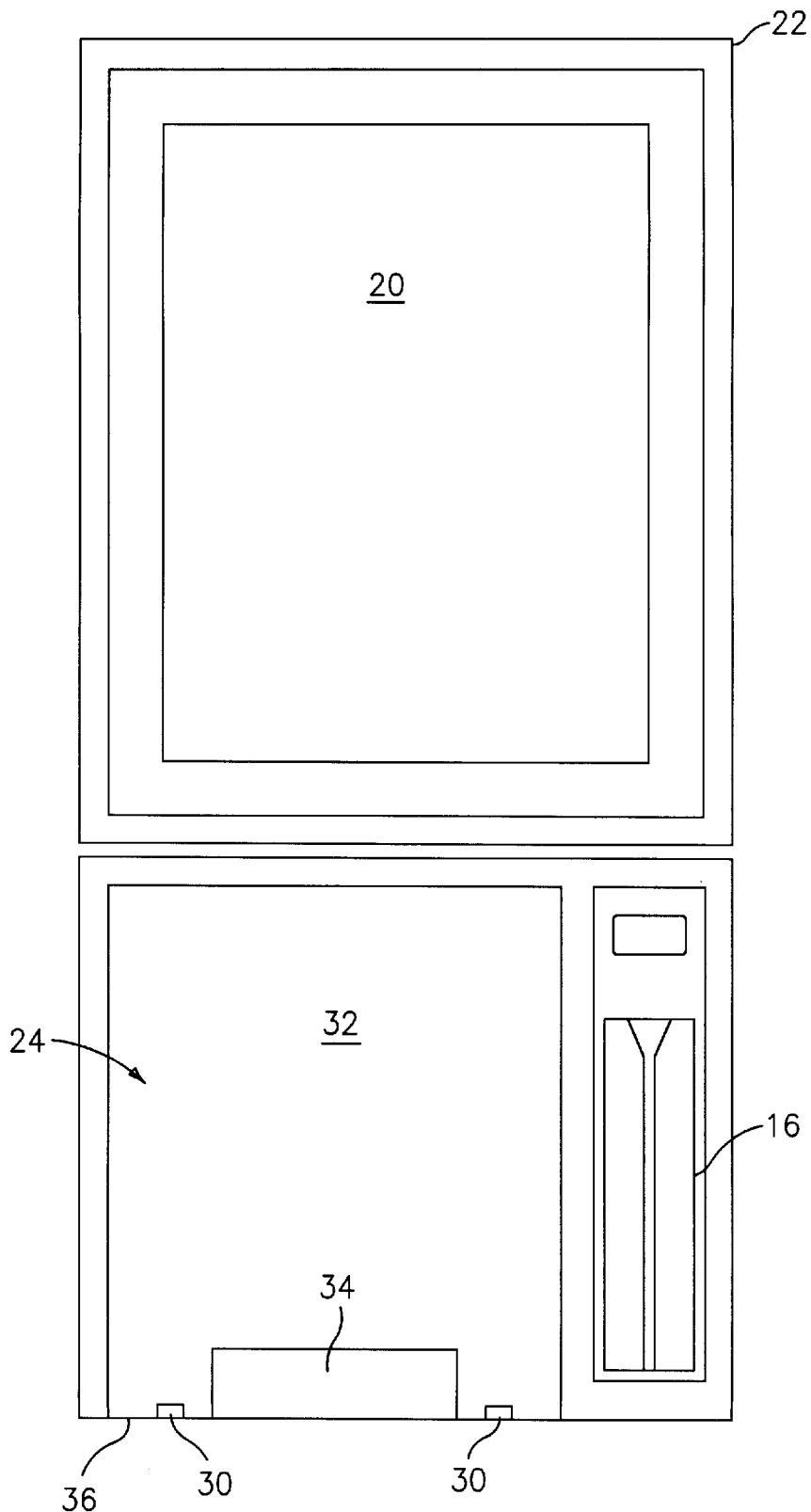
FIG. 1 is a front view of an in-store dispenser used in the store-level marketing system of the present invention.
Figure 2:
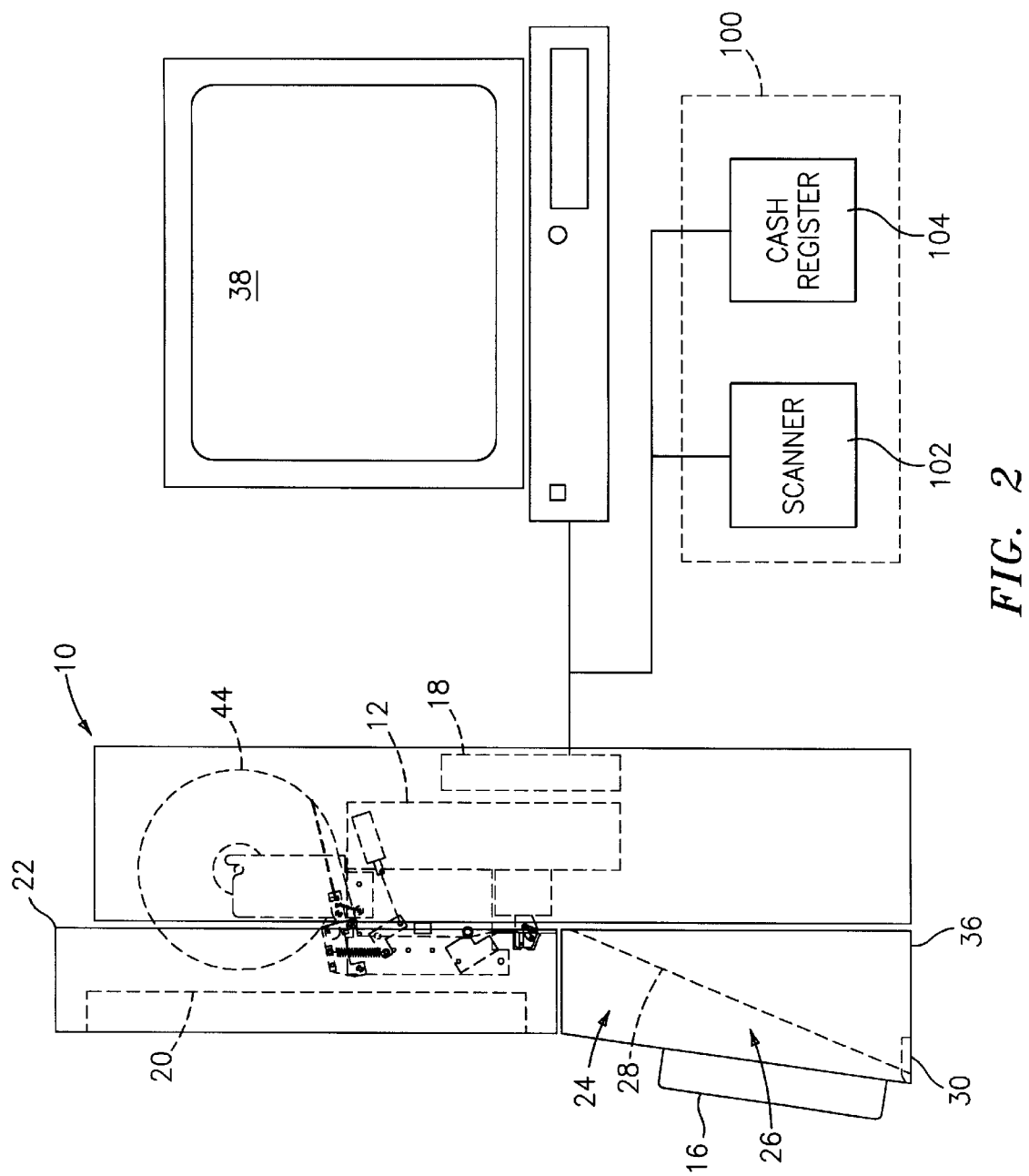
FIG. 2 is a side view of the in-store dispenser shown in FIG. 1.
Figure 3:
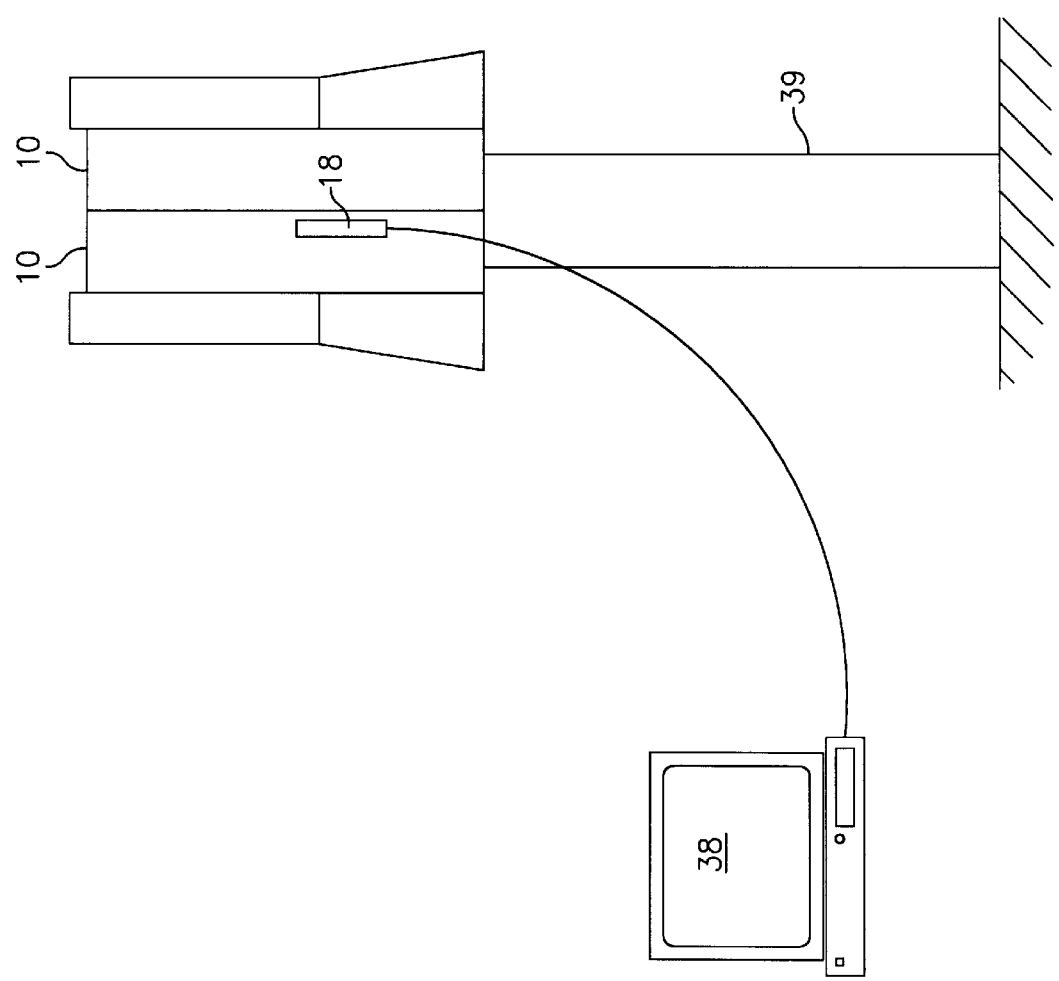
FIG. 3 illustrates a pair of dispensers mounted on a floor stand and connected to a remote computer that controls the store-level marketing system.

Referring now to the drawings, the store-level marketing system of the present invention, as shown in FIGS. 1 and 2, includes an enclosure 10 such as a cabinet to be placed in a retail store such as a supermarket, drug store, convenience store, department store or any other retail or commercial environment. The cabinet 10 may be placed in any location in the store convenient for access by consumers. The cabinet 10 may be fabricated from any suitable material such as wood or plastic. As shown in FIG. 3, two cabinets 10 may be mounted to a floor stand 39. Any suitable means known in the art may be used to mount the cabinets 10 to the floor stand 39.

The cabinet 10 houses a printer 12 for printing a paper document 11, such as the savings sheet shown in FIG. 7. This document may contain one or more offers, savings, or discounts as well as product information. The cabinet 10 further houses a supply of paper 14 for the printer 12 and an activation device 16 such as an optical card reader, a magnetic stripe reader, a push button and/or a keyboard. Preferably, the printer 12 is mounted in a vertical position.

The activation device 16 is used to trigger the system and input information about the consumer, such as a name, an address, an identification number, an account number and/or an access code, into the system. The consumer information or consumer identifier may be carried on a card to be read by an optical card reader or, alternatively, on a magnetic stripe on the back of a card, which stripe is read by a magnetic stripe reader when the card is run through the reader. The activation device 16 could also be a keyboard, key pad or a push button device which enables a user to gain access to the system. If desired, the system may employ more than one of the above activation devices. In one embodiment of the present invention, the activation device 16 communicates with a network interface or a computer 18 which can be housed within the cabinet 10 or located in another area of the retail environment. The network interface or computer 18 may comprise any suitable computer known in the art. The network interface or computer 18 may be used to store profile information about consumers and their shopping habits, to store information about offers, in the form of discounts, cents off, dollars off, percent off, or buying combinations, such as buy three get one free, and the like, and to store product information, all of which can be issued to consumers. When the in-store dispenser is activated, the network interface or computer 18, through its programming identifies the user and selects a number of promotional offers to be issued to the consumer from the stored information about such offers. The selection may be based in part on the profile of the consumer in storage or on other criteria. The program for enabling the computer to select the offers/discounts to be issued to the consumer does not form part of the present invention. Any suitable program having the desired functionality in any suitable programming language could be used. The network interface or computer 18 is connected to the printer 12. It communicates with the printer 12 and instructs it as to what offers and information are to be printed on the paper document 11.

If desired, the network interface or computer 18 may be programmed to instruct the printer 12 to print certain offers to a new consumer upon which the network interface or computer 18 has no consumer buying profile. By using the activation device 16, i.e. by pushing a button or a certain key on a keyboard or key pad, a consumer may gain access to the system and initiate the computer programming for him or her to obtain a paper document 11 bearing purchase incentives and/or product and/or store information.

The network interface or computer 18 is also preferably programmed to instruct the printer 12 to print certain information on the paper document 11 bearing the offers. This information includes a unique code, such as a bar code, which identifies the consumer and/or the document. Still further, the network interface or the computer 18 may be programmed to instruct the printer 12 to print promotional messages advising the consumer of certain product information and/or other products for sale in the store.

The cabinet 10 may include a light box area 20 in which a message to consumers or the name of an advertiser can be displayed, which message may be back lit by a light bulb not shown. The light box area 20 may be housed within a panel 22 which is hingedly connected to a side wall of the cabinet 10. By providing such a hinge connection, the panel 22 may be pivoted so that access to the interior of the cabinet 10 can be easily gained.

The cabinet 10 further includes a gravity feed chute 24 which aligns with the outlet of the printer 12. The gravity feed chute 24 has sidewalls 26, an angled back wall 28, holding fingers 30, and a cover plate 32. The cover plate 32 is provided with a slot 34 adjacent its lower end to enable a consumer to take the printed document containing the offers. The cover plate 32 is preferably formed from a clear material, such as a LEXAN or some other clear plastic material, and allows a consumer to see the printed document immediately as printing begins. If desired, the gravity feed chute 24 may be housed in a panel 36 which is also hingedly connected to a sidewall of the cabinet 10. In this way, further access to the interior of the cabinet can be gained. As shown in FIG. 1, the panel 36 may also house the activation device 16.

If desired, the profile information about consumers and the information about available offers could be stored in a remote computer 38 located externally of the cabinet 10. The remote computer 38 could make the decision about the offers to be issued to a consumer and transmit that information to the printer 12 in a cabinet 10 via the network interface or computer 18 and appropriate communication links. In such a system, the remote computer 38 would receive the information inputted by the consumer via the network interface or computer 18 and the communications link between the two.

In yet another alternative embodiment, the network interface or computer 18 may be omitted altogether. In this embodiment, information inputted via the activation device 16 is transmitted to the remotely located computer 38 via a communications link and instructions are transmitted from the computer 38 to the printer 12 via a suitable communications link.

The printer 12 used in the store level marketing system of the present invention is preferably a thermal printer. Typically in such printers, the thermal paper to be used in the printer is supplied wound on a 2" diameter roll or core. The result is a natural bend or curl in the paper, which curl is aesthetically unpleasing and troublesome when the paper is fed into the printer. The printer 12 employed in the store level marketing system of the present invention is provided with a means for substantially eliminating this curl in the paper.

Figure 4:
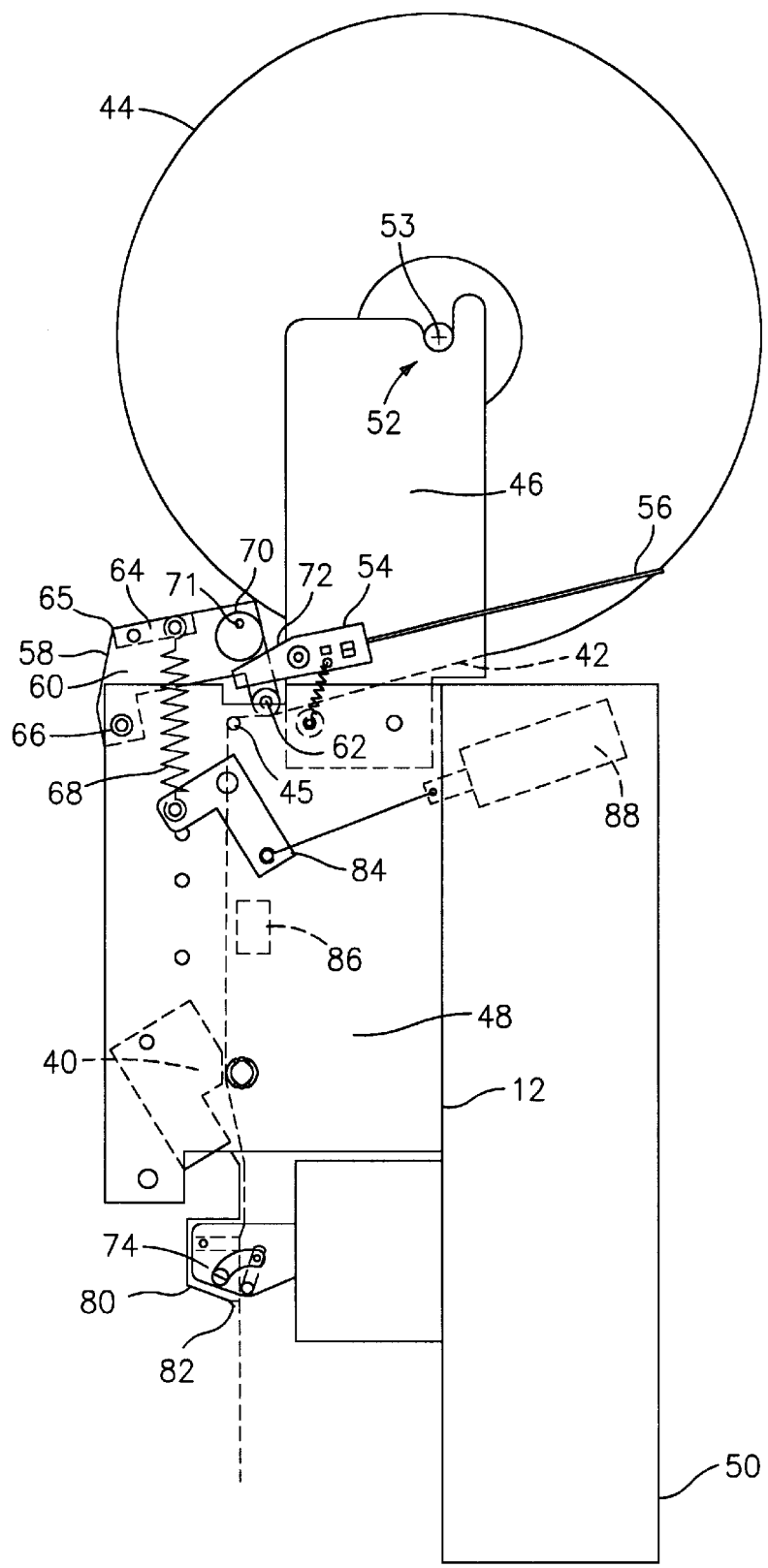
FIG. 4 is a side view of a printer assembly having the curl removing means of the present invention attached thereto.

As shown in FIG. 4, the printer 12 has a printing head assembly 40 for printing a desired set of information onto paper 42 supplied from a supply roll 44 of paper. Paper 42 from the supply roll 44 is threaded around a fixed tube 45 in the printer assembly and into the printing head assembly 40. The supply roll 44 is supported above the printer by a pair of paper holder arms 46 attached to the sidewalls 48 of the printer casing 50 by suitable fastening means such as screws or bolts. One of the holder arms 46 is shown in FIG. 4.

Each paper holder arm 46 may be designed to hold an eight and one half inch width wide roll of paper eight inches in diameter when the printer 12 is in its vertical position. The holder arm 46 may be fabricated from aluminum stock. Each holder arm 46 has a notch 52 in which an end of the core roll spindle 53 supporting the paper roll rests.

A cam assembly 54 having a cam surface 72 is pivotally mounted to one of the holder arms 46. Attached to one end of the cam assembly 54 is a paper follower 56 formed from a wire. The paper follower 56 contacts a surface of the supply roll 44. As the supply of paper in the supply roll 44 diminishes, the paper follower 56 moves and the position of the cam assembly 54 relative to the holder arm 46 is changed.

Figure 5:
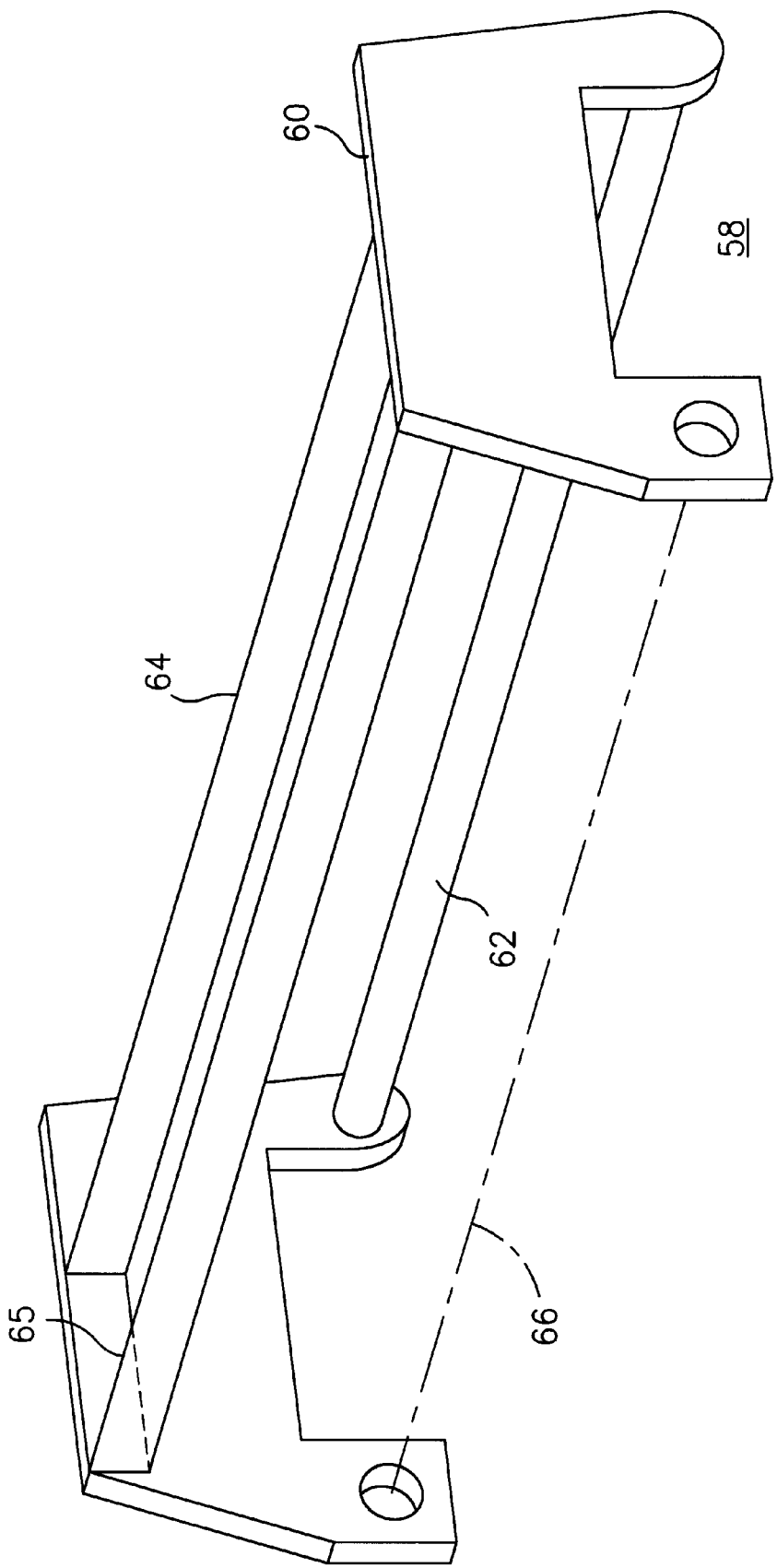
FIG. 5 is a front view of the attachment mounted to the sides of the printer assembly.

Also attached to the sidewalls 48 of the printer casing 50 is a mechanism 58 for applying a reverse curl to the paper 42. As shown in FIG. 5, the mechanism 58 comprises a pair of side arms 60 and a tube 62 positioned between the side arms 60. The mechanism 58 also includes a bar 64 connected to the side arms 60. The side arms 60, tube 62 and bar 64 may be fabricated from a lightweight metallic material such as aluminum. The bar 64 preferably has a rear straight edge 65 which is used to cut the paper 42 straight for threading.

As shown in FIG. 4, the mechanism 58 is pivotally mounted to each sidewall of the casing 50 by a pivot pin 66. This enables the mechanism 58 to be moved from an operational position where the tube 62 contacts the paper 42 being fed into the printer head assembly 40 to a non-operational position where the tube 62 is no longer in contact with the paper 42 and where the paper 42 can be threaded into the printing head assembly 40. A spring 68 is provided to hold the mechanism 58 in its operational position and to maintain the contact between the tube 62 and the paper 42 while the mechanism 58 is in that position. Any suitable means known in the art may be used to mount the spring between one of the side arms 60 and a sidewall 48 of the casing 50.

Also mounted to one of the side arms 60 is an adjustable cam follower 70. The cam follower 70 is adjustable to allow for different paper weights. Adjustment of the cam follower 70 is made by loosening a screw 71 mounting the cam follower 70 to the side arm 60 and rotating the cam follower.

As can be seen from FIG. 4, the screw 71 is positioned off-center so that rotation of the cam follower 70 changes the position of that part of the cam follower 70 contacting the cam surface 72 on the cam assembly 54. In operation, the contact between the cam follower 70 and the cam surface 72 determines the amount of reverse curl applied to the paper 42. This is because the position of the mechanism 58 is changed as the cam assembly 54 is adjusted to reflect changes in the supply of paper 42.

When the mechanism 58 is moved to its non-operational position for threading, the cam follower 70 moves out of contact with the surface 72. When this occurs, the cam assembly 54 rotates and the paper follower 56 moves out of contact with the surface of the paper 42 on the supply roll 44.

The reverse curl mechanism 58 also includes a solenoid 88 and an activation arm 84 to prevent the paper 42 from taking a set by tube 62 and fixed tube 45. When the printer is not printing a document, the mechanism 58 should not be in contact with the paper 42. Therefore, solenoid 88 is only activated when a document is being printed. When solenoid 88 is activated, the activation arm 84 is pulled toward the solenoid causing spring 68 to engage mechanism 58.

The reverse curl mechanism 58 of the present invention operates in the following manner. As the paper comes off the roll 44, it will have a natural curl. A reverse curl or bend, opposite to the natural curl or bend, is imparted by the tube 62 contacting the paper 42. By controlling the exit angle of the paper coming off the tube 62 in relationship to the fixed tube 45, a flat and straight paper substantially without any curls can be introduced into the printing head assembly 40. The spring mechanism and the cam follower and cam assembly assure that the proper exit angle is maintained and assure that the proper reverse curl is supplied to the paper.

The printer 12 is also provided with a means 74 for cutting the paper 42 after the printing head assembly 40 finishes printing a document 11 such as that shown in FIG. 7. After the paper is cut, the document 11 falls into the gravity feed chute 24 which is aligned with the outlet of the printer 12.

As shown in FIG. 4, the cutting means 74 may include a holder 80 for a static elimination brush 82. The brush 82 is used to discharge substantially any static built up on the paper 42 during the printing process. The brush will also help guide the paper into the chute 24 and protect an operator from the cutter bar assembly 74 used in the cutting means.

If desired, the printer 12 may also include a photo cell assembly 86 for indicating that the printer is out of paper. Any suitable photo cell assembly known in the art may be used.

After the consumer has received his/her savings sheet and completed his/her shopping in the store, the consumer takes the savings sheet and his/her purchases to a checkout station 100.

In a preferred embodiment of the present invention, the checkout station includes a scanner 102 for scanning the code on the savings sheet and for scanning the codes of the products that have been purchased by the consumer and a cash register 104. The scanner may comprise any suitable scanner known in the art. Preferably, it communicates with the network interface or computer 18 through suitable communication lines.

Once the scanner 102 scans the savings sheet, a signal is sent via the communication lines to the network interface or computer 18 to identify the document and to cancel the document so that it can not be used a second time. As the products purchased by the consumer are scanned, information about the products is also sent to the network interface or computer 18 via the communication lines. The network interface or computer 18 then compares the products purchased by the consumer with the offers on the identified document. If the network interface or computer finds that the consumer is qualified for a particular offer, it sends a signal to the cash register which allows the consumer to receive an instantaneous discount or the like.

The product information received by the network interface or computer 18 is saved in a file which contains other information about the consumer. By doing this, a consumer purchaser profile can be maintained. If desired, the product information could also be stored in other files. For example, the information could be stored in files which identify the purchase volume of a particular product. The information could also be stored in files which identify the number of consumers that have taken advantage of certain offers or promotional incentives.

One of the principal advantages to the store level marketing system of the present invention is that an eight and one-half by fourteen sheet of paper containing a number of offers can be printed and presented to a consumer within five to seven seconds after initiation of the dispensing process. Yet another advantage of the store level marketing system of the present invention is that the document containing the offers can be customized for each customer. Still further, the system of the present invention allows the retailer/marketer to develop a history of the consumer's purchases as well as a history of purchases of a particular product.

It is apparent that there has been provided in accordance with this invention a store level marketing system which fully satisfies the objects, means, and advantages set forth hereinbefore. While the invention has been described in combination with specific embodiments thereof, it is evident that many alternatives, modifications and variations will be apparent to those skilled in the art in light of the foregoing description. Accordingly, it is intended to embrace all such alternatives, modifications, and variations as fall within the spirit and broad scope of the appended claims.

What is claimed is:

1. A store level marketing system which comprises:

means for dispensing a document containing printed promotional offers available to a consumer;

said dispensing means including a printer;

means for activating said dispensing means;

means associated with said activating means for selecting a unique identification number to be assigned to said document and for determining said offers to be made available to said consumer and for causing said document with said unique identification number to be printed and dispensed;

said selecting means instructing said printer as to the identification number, the offers and the product information to be printed on said document;

said printer comprising means for holding a supply of paper to be fed into said printer, a printing head assembly for placing printed matter on a surface of said paper, and means for substantially removing curls in said paper;

said printer having a casing;

said curl removing means comprising an attachment pivotally mounted to the sidewalls of said casing; and said attachment having two side arms and a means for introducing a reverse curl to said paper being fed into said printer.

2. The system of claim 1 further comprising:
a database containing information about available offers and product information; and
said selecting means interacting with said database to select certain ones of said offers and product information to be printed on said document.

3. The system of claim 2 further comprising:
said activating means further comprising means for identifying said consumer;
said database further containing information about said consumer; and
said selecting means selecting said offers and said product information based upon information contained in said database about said consumer.

4. The system of claim 1 wherein said dispensing means includes a gravity feed chute aligned with an output of the said printer and said gravity feed chute has a slot through which said consumer can take said document.

5. The system of claim 1 wherein said selecting means comprises a computer.

6. The system of claim 1 wherein said reverse curl introducing means comprises a first tube extending between said side arms, said first tube being pressed against a surface of said paper being fed into said printer when said attachment is in an operational position.

7. The system of claim 1 further comprising:
a fixed tube against which said paper moves, said fixed tube being supported by said sidewalls of said casing; and
spring means for holding said first tube against said paper when said attachment is in said operational position so as to control the exit angle of the paper coming off said first tube in relation to said fixed tube and thereby provide a substantially flat and straight paper to said printing head assembly.

8. The system of claim 1 further comprising:
said paper supply holding means includes an arm extending from one sidewall of said printer casing, said arm having a notch for receiving an end of a roll about which said supply of paper is wound; and
said curl removing means further comprises a cam pivotally mounted to said arm extending from said one sidewall of said printer casing.

9. The system of claim 8 further comprising:
a paper follower attached to an end of said cam, said paper follower having an end contacting a surface of said paper wound about said roll; and
said curl removing means including a cam follower attached to one of said side arms, said cam follower contacting a surface of said cam,
whereby the position of said cam relative to said arm extending from said one sidewall of said printer casing is adjusted as the supply of paper on said roll is reduced and said adjusted position of said cam is transmitted to said attachment via said cam follower and said attachment side arms so as to adjust the amount of reverse curl applied to said paper being fed into said printer.

10. The system of claim 9 further comprising:
said cam follower being adjustable to allow for different paper weights.

11. The system of claim 1 further comprising means for connecting said printer head to a device which issues instructions to said printer as to the material to be printed on said paper.

12. The system of claim 11 wherein said instruction issuing device communicates with an input device for receiving information about a consumer.

13. The system of claim 1 further comprising:
means for cutting said paper after the printing process has been completed; and
a gravity chute associated with said printer for receiving said cut paper.

14. The system of claim 13 wherein said cutting means includes brush means for substantially discharging any static built up on said paper during the printing process.

15. A printer for providing printed documents on paper comprising:
means for holding a supply of paper to be fed into said printer;
a printing head assembly for placing printed matter on a surface of said paper;
means for substantially removing curls in said paper;
said printer having a casing;
said curl removing means comprising an attachment pivotally mounted to the sidewalls of said casing; and
said attachment having two side arms and a means for introducing a reverse curl to said paper being fed into said printer.

16. The printer of claim 15 further comprising:
a fixed tube against which said paper moves, said fixed tube being supported by said sidewalls of said casing; and
spring means for holding said first tube against said paper when said attachment is in said operational position so as to control the exit angle of the paper coming off said first tube in relation to said fixed tube and thereby provide a substantially flat and straight paper to said printing head assembly.

17. The printer of claim 15 further comprising:
said paper supply holding means includes an arm extending from one sidewall of said printer casing, said arm having a notch for receiving an end of a roll about which said supply of paper is wound; and
said curl removing means further comprises a cam pivotally mounted to said arm extending from said one sidewall of said printer casing.

18. The printer of claim 17 further comprising:
a paper follower attached to an end of said cam, said paper follower having an end contacting a surface of said paper wound about said roll; and
said curl removing means including a cam follower attached to one of said side arms, said cam follower contacting a surface of said cam,
whereby the position of said cam relative to said arm extending from said one sidewall of said printer casing is adjusted as the supply of paper on said roll is reduced and said adjusted position of said cam is transmitted to said attachment via said cam follower and said attachment side arms so as to adjust the amount of reverse curl applied to said paper being fed into said printer.

19. The printer of claim 18 further comprising:
said cam follower being adjustable to allow for different paper weights.

20. The printer of claim 15 wherein said reverse curl introducing means comprises a first tube extending between said side arms, said first tube being pressed against a surface of said paper being fed into said printer when said attachment is in an operational position.

21. The printer of claim 15 further comprising means for connecting said printer head to a device which issues instructions to said printer as to the material to be printed on said paper.

22. The printer of claim 21 wherein said instruction issuing device communicates with an input device for receiving information about a consumer.

23. The printer of claim 15 further comprising:

means for cutting said paper after the printing process has been completed.

24. The printer of claim 23 wherein said cutting means includes brush means for substantially discharging any static built up on said paper during the printing process.

25. A system for printing and dispensing a paper document containing promotional incentives and/or offers to a consumer, said system comprising:

a printer mounted within an enclosure, said printer being in communication with a means for instructing said printer to issue said paper document to said consumer;

said printer comprising a printing head assembly, a supply of paper supported by holder arms mounted to a casing surrounding said printing head assembly, and means for substantially removing curls from said paper being fed into said printing head assembly;

said curl removing means comprising an attachment mounted to sidewalls of said casing, said attachment being pivotally movable relative to said casing and being maintained in an operational position by spring means connected to said attachment and to said casing;

said attachment having two side arms and a tube positioned between said side arms; and said tube contacting said paper prior to said paper being introduced into said printing head assembly and introducing a reverse curl into said paper.

26. The system of claim 25 further comprising:

a cam assembly mounted to one of said holder arms;

said cam assembly having a paper follower extending from one end thereof;

said paper follower having an end in contact with a surface of said supply of paper and said cam assembly being adjusted when said paper follower detects a change in said paper supply; and a cam follower in contact with said cam assembly, said cam follower being sensitive to changes in the position of said cam assembly and transmitting the changes to said tube for imparting said reverse curl to said paper.

27. The system of claim 25 further comprising:

means for providing information about said consumer to said instructing means; and said instructing means issuing its instructions to said printer based upon said information about said consumer.

28. The system of claim 25 wherein said instructing means comprises a computer.

29. The system of claim 28 wherein said computer is located externally of said enclosure.

30. The system of claim 25 further comprising:

said printer being mounted vertically within said enclosure;

said enclosure having a gravity feed chute having an opening at its lower end;

said printer dispensing said printed document with said at least one coupon into said gravity feed chute; and said consumer removing said printed document with said at least one coupon from said chute via said opening.

31. A store level marketing system for use by retailers comprising:

an enclosure positioned at a retail location;

said enclosure including an external activation device for allowing a consumer to identify himself or herself;

a computer connected to said activation device for receiving consumer identification information from said activation device; said computer being connected to a data base containing a number of promotional offers available to said consumer and information to be dispensed to consumers and consumer profile information;

said computer being programmed to select at least one of said promotional offers available to said consumer and said information based upon said consumer identification information received from said activation device;

a printer housed within said enclosure in a vertical orientation;

said printer receiving instructions from said computer to print a document containing a unique identification code and said selected at least one of said promotional offers and said information;

said enclosure including a gravity chute aligned with an output of said printer for receiving said printed document, said gravity chute including a rear wall, sidewalls, a cover plate, finger means for holding said printed document, and a slot in said cover plate to enable said consumer to remove said printed document from said chute;

at least one checkout station at said retail location;

said at least one checkout station including means for scanning said printed document and for forwarding a signal about said identification code to said computer so that said computer cancels said identification code, thereby preventing re-use of said printed document; and said computer receiving information from said check-out station about consumer purchases and storing said purchase information in said data base as part of said consumer profile information.

32. The system of claim 31 wherein said printer comprises a thermal printer having means for substantially eliminating any curls in the paper on which said document is printed.

33. The system of claim 32 wherein said printer has a printing head and said curl eliminating means comprises means for introducing a reverse curl into said paper before said paper enters said printing head.

34. The system of claim 31 wherein said printer comprises:

means for holding a supply of paper to be fed into said printer;

a printing head assembly for placing printed matter on a surface of said paper; and means for substantially removing curls in said paper.

35. The system of claim 31 further comprising:

said at least one checkout station including a cash register;

said printed document contains a plurality of promotional offers; and said computer comparing the products purchased by the consumer with the offers on said printed document and issuing a signal to said cash register when it has been determined that said consumer qualifies for one of said offers on said printed document.

36. A store level marketing system for use by retailers comprising:

an enclosure positioned at a retail location;

said enclosure including an activation device for allowing a consumer to identify himself or herself;

a computer connected to said activation device for receiving consumer identification information from said activation device;

said computer being connected to a data base containing a number of promotional offers available to said consumer and said data base further containing consumer profile information;

said computer being programmed to select at least one of said promotional offers available to said consumer based upon said consumer identification information received from said activation device;

a printer housed within said enclosure in a vertical orientation;

said printer receiving instructions from said computer to print a document containing a unique identification code and said selected at least one of said promotional offers;

said enclosure including a gravity chute aligned with an outlet of said printer for receiving said printed document;

at least one checkout station at said retail location;

each said checkout station including means for scanning said printed document and for forwarding a signal about said identification code to said computer so that said computer cancels said identification code, thereby preventing re-use of said printed document; and said computer receiving information from said at least one check-out station about consumer purchases and storing said purchase information in said data base as part of said consumer profile information.

37. A store level marketing system which comprises:

means for dispensing a document containing printed promotional offers available to a consumer;

means for activating said dispensing means;

means associated with said activating means for selecting an identification number to be assigned to said document and for determining said offers to be made available to said consumer;

said dispensing means including a printer for printing said document containing said identification number;

a checkout station having means for scanning said identification number on said document and codes on products purchased by said consumer;

said scanning means communicating with said selecting means so as to provide said selecting means with information about said identification number and said products purchased by said consumer;

said printer having a casing and means for substantially removing curls in paper on which said document is printed;

said curl removing means comprising an attachment pivotally mounted to the sidewalls of said casing; and said attachment having two side arms and a means for introducing a reverse curl to said paper which is fed into said printer.

38. The system of claim 37 wherein said selecting means compiles and stores information about said consumer and the products purchased by said consumer.

39. The system of claim 37 wherein said scanning means transmits a signal representing said identification number on said document to said selecting means and said selecting means after receiving said signal invalidates said document after said identification number has been scanned so as to prevent said document from being reused.

* * * * *